United States Patent [19]

Huston et al.

[11] Patent Number: 6,146,143
[45] Date of Patent: Nov. 14, 2000

[54] DYNAMICALLY CONTROLLED VEHICLE SIMULATION SYSTEM, AND METHODS OF CONSTRUCTING AND UTILIZING SAME

[75] Inventors: Genevieve Huston, Plymouth; John Dibbs, Ypsilanti; Thomas McClelland, Howell; Scott Thompson, Whitmore Lake, all of Mich.

[73] Assignee: FAAC Incorporated, Ann Arbor, Mich.

[21] Appl. No.: 08/835,683

[22] Filed: Apr. 10, 1997

[51] Int. Cl.[7] .................................................. G09B 9/04
[52] U.S. Cl. .................... 434/69; 434/307 R; 345/118; 700/9
[58] Field of Search .................. 434/29, 62, 63, 434/64, 65, 69, 71, 307 R, 308, 365, 373; 348/61; 364/410, 578; 395/500; 273/148 R; 463/1, 7, 40, 43; 345/118, 121, 145, 473; 700/9; 703/6

[56] References Cited

U.S. PATENT DOCUMENTS

| | | | |
|---|---|---|---|
| 4,750,888 | 6/1988 | Allard et al. | 434/69 |
| 4,760,388 | 7/1988 | Tatsumi et al. | 434/69 X |
| 4,817,948 | 4/1989 | Simonelli | 434/71 X |
| 5,017,141 | 5/1991 | Relf et al. | 434/29 |
| 5,131,848 | 7/1992 | Adams . | |
| 5,184,956 | 2/1993 | Langlais et al. | 434/69 |
| 5,261,820 | 11/1993 | Sly et al. | 434/307 R X |
| 5,269,687 | 12/1993 | Mott et al. . | |
| 5,275,565 | 1/1994 | Moncrief | 434/69 X |
| 5,277,584 | 1/1994 | DeGroat et al. | 434/71 X |
| 5,366,376 | 11/1994 | Copperman et al. . | |
| 5,415,550 | 5/1995 | Aoki et al. | 434/29 X |
| 5,474,453 | 12/1995 | Copperman . | |
| 5,547,382 | 8/1996 | Yamasaki et al. | 434/61 |
| 5,573,402 | 11/1996 | Gray . | |
| 5,660,547 | 8/1997 | Copperman | 434/62 X |

OTHER PUBLICATIONS

FAAC Report No. FR8010U/4846–245, Truck Driving Simulator Operator/Maintenance Manual, Jun. 1996, prepared for Allied Signal Inc. pp. 1–6, 9–10, 12–19, 22–27, 29–30, 36–47, 49–56, Kansas City, MO.

FAAC Report No. FR8016U/6150–201, Driver Training System (DTS) Functional Specification, Oct. 1996, FAAC, Inc., pp. 1–1–1–2 2–1–2–5, 3–1, 4–1–4–2, 5–1, 6–1–6–8, A–1, B–1–B–2, C–1, D–1 Ann Arbor, MI.

"Simulation aids training for Hong Kong Mass Transit Railway" by Linsell, IMechE 1979 RailEngineer International, May/Jun. 1979, p. 61–64.

*Primary Examiner*—Joe H. Cheng
*Attorney, Agent, or Firm*—Jenkens & Gilchrist, P.C.

[57] ABSTRACT

A system for simulating the operation of a vehicle, comprising a monitor for displaying a sequence of visual images; a plurality of control devices for the simulated vehicle for manipulation by an operator of the simulated vehicle; a computer, responsive to manipulation of the simulated vehicle control devices, for presenting a temporal sequence of visual images to the operator on the monitor which depicts the operation of the simulated vehicle along a roadway in a simulated environment; a mechanism for dynamically controlling weather effects in the simulated environment; and a mechanism for creating a traffic event in the simulated environment on demand during a simulation session and presenting the traffic event to the operator substantially immediately thereafter.

42 Claims, 9 Drawing Sheets

DYNAMICALLY CONTROLLED VEHICLE SIMULATION SYSTEM, AND METHODS OF CONSTRUCTING AND UTILIZING SAME

BACKGROUND OF THE INVENTION

1. Field of Invention

This invention generally relates to a vehicle simulation system, and particularly to a simulator for land vehicles which accurately simulates driving a vehicle in various weather conditions and which is capable of presenting virtually any type of traffic event to a user of the system.

2. Description of the Relevant Art

There are known systems which emulate vehicle operation. These known simulation systems, such as video arcade games and driver training simulators, fail to accurately simulate the operation of a vehicle in a wide variety of traffic and weather related conditions. As a result, users of these systems fail to adequately develop the skills necessary to become an experienced operator of a motor vehicle.

For example, a known system is Adams U.S. Pat. No. 5,131,848, which discloses a testing apparatus which records a user's response to a series of threatening and non-threatening events appearing on a video screen.

Chen U.S. Pat. No. 5,180,347 discloses an exercise bicycle having a means for changing pedal resistance to correspond to a visual display.

Langlais U.S. Pat. No. 5,184,956 discloses a driver training device including display monitors for presenting a sequence of images which are responsive to testee input. The display monitors present both a forward and rear view of a simulated environment.

Mott U.S. Pat. No. 5,269,687 discloses a video game apparatus.

Copperman U.S. Pat. No. 5,366,376 and Gray U.S. Pat. No. 5,573,102 disclose a vehicle simulator having a means for projecting a sequence of visual images of a roadway system based upon manipulation of control devices for the simulated vehicle. The system also emulates driving in various atmospheric conditions.

Copperman U.S. Pat. No. 5,474,453 discloses a vehicle simulator having a means for programming a traffic scenario prior to a simulation session. This Copperman simulator, however, is restrictive in its capability to provide virtually any type of traffic condition or weather condition to the system user.

The above identified devices fail to disclose a vehicle simulator which accurately depicts the operation of a vehicle in various weather conditions, such as in snow, rain, fog or heavy wind, or a simulator which provides instructor-controlled traffic events and weather conditions on demand during the course of a simulation session.

SUMMARY OF THE PRESENT INVENTION

The present invention overcomes the above-discussed limitations and shortcomings of known vehicle simulation systems and satisfies a significant need for a system which accurately depicts the operation of a land based vehicle under a wide variety of driving conditions.

According to the present invention, there is provided a system for simulating the operation of a vehicle, comprising video means for displaying a sequence of visual images; a plurality of control devices for the simulated vehicle for manipulation by a first user of the system, such as a driver testee; computing means, responsive to manipulation of the simulated vehicle control devices, for presenting a temporal sequence of visual images to the first system user on the video means which depicts operation of the simulated vehicle along a roadway in a simulated environment; and a means for creating and dynamically controlling one or more driving conditions during the course of a simulation session.

In use, a system user specifies during simulation setup the nature and extent of weather related conditions and general traffic behavior for a simulation session. During the simulation session, the computing means presents a temporal sequence of visual images on the video means to the first system user which depicts the first user travelling along a roadway in a simulated environment. The simulated environment is preferably populated with simulated objects, including other simulated vehicles, pedestrians, traffic lights, etc. The sequence of visual images is in accordance with the operation of the simulated vehicle input controls by the first user. As a result, the first user has substantially autonomous control over the operation of the simulated vehicle in the simulated environment.

At virtually any time throughout the simulation session, a second system user may define and present one or more driving conditions to the first system user using the driving condition creating means. Upon defining the desired condition, such as by selecting from a list of predetermined traffic events or weather conditions, the condition creating means incorporates the selected driving condition into the presentation of the simulated environment.

In the event a traffic event is selected, the traffic event is presented by the computing means in part by selecting an existing simulated object from the simulated environment or spawning a simulated object, and utilizing the selected/spawned object in the traffic event presentation. If a weather condition is selected or an existing weather condition is modified during the simulation session, the computing means preferably changes the visual presentation of the simulated environment, the audio presentation thereof, and the vehicle dynamics of the simulated vehicle. The changes in the visual presentation may include the depiction of falling precipitation and/or the reduction in visibility of objects appearing in the simulated environment.

In addition, changes in the vehicle dynamics of the simulated vehicle may include recalculating frictional and resistive forces as a function of the selected weather conditions.

It is an object of the present invention to provide a vehicle simulation system which accurately depicts the operation of a vehicle in any of a number of different driving conditions.

Another object of the present invention is to provide such a system which accurately simulates vehicular operation in changing weather conditions, such as vehicular operation in snow, rain, ice, fog and/or heavy winds.

A further object of the present invention is to dynamically control the nature and extent of traffic and weather conditions occurring in a simulation session.

Still another object of the present invention is to provide such a vehicle simulation system in which an instructor may define and present a traffic event independently of the location of the simulated vehicle in the simulated environment.

Other objects, advantages, and salient features of the present invention will become apparent from the following detailed description, which, when taken in conjunction with the annexed drawings, discloses preferred embodiments of the present invention.

DETAILED DESCRIPTION OF THE PREFERRED EMBODIMENTS

Figure 1:
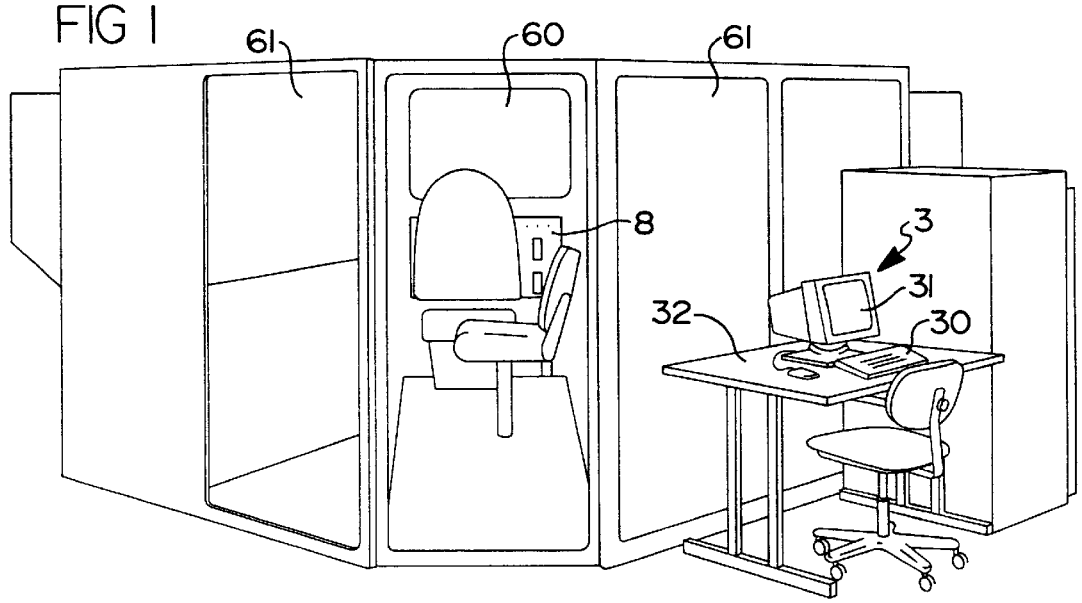
FIG. 1 is a front elevational view of the present invention according to a preferred embodiment of the present invention.
Figure 4:
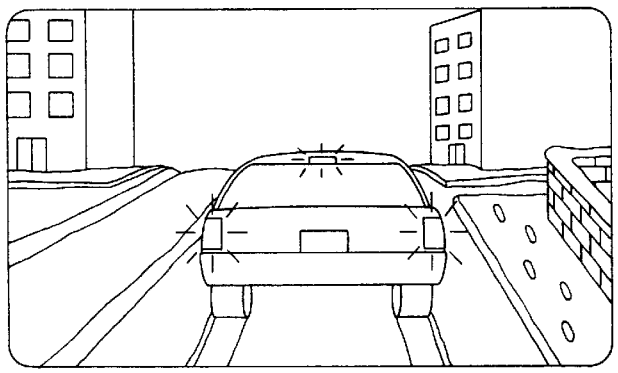
FIG. 4 is a user's view of a typical simulated environment provided by a preferred embodiment of the present invention.

Referring to FIGS. 1–14, there is shown a system which simulates the operation of a vehicle according to preferred embodiments of the present invention, including a computing means 1, driving station 2, input devices 3, audio speakers 5 and video means 6 for displaying a sequence of visual images as controlled by computing means 1.

Figure 3:
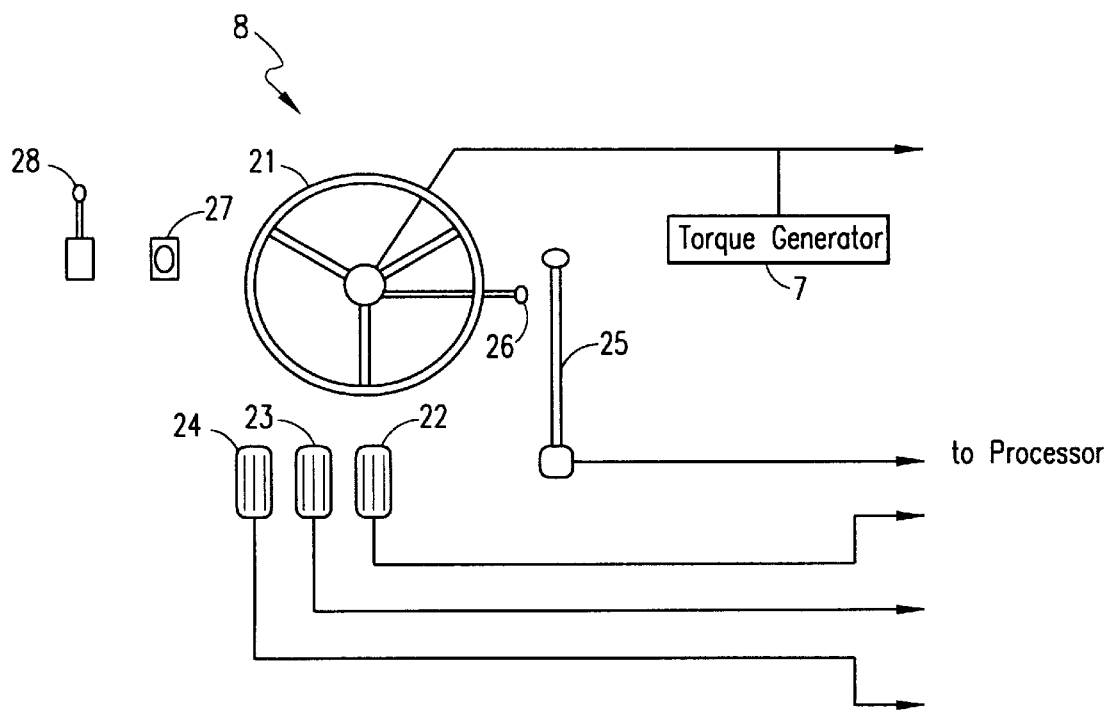
FIG. 3 is a diagram of a portion of a preferred embodiment of the present invention.

Driving station 2 preferably but not necessarily emulates a compartment of the type of vehicle being simulated. As shown in FIG. 1, when the present system is configured for simulating a land-based vehicle, driving station 2 preferably includes a driver's seat, a dashboard having gauges and other instrumentation, and control devices 8 which simulate the controls of the vehicle being simulated. Each input device 8 is preferably electrically connected to computing means 1 so that computing means 1 monitors the control and/or manipulation of control devices 8 by the system user for use in simulating the operation of the simulated vehicle. In one preferred embodiment of the present invention in which a land-based vehicle is simulated, control devices 8 preferably include steering wheel 21, accelerator 22, brake 23, clutch 24, gear shift 25, turn signal 26, windshield wiper control mechanism 27 and mirror control mechanism 28, as shown in FIG. 3.

Input devices 3 preferably comprises monitor 31, keyboard 30 and mouse 32 for transmitting and receiving data pertaining to a simulation session, as shown in FIG. 1. It is understood that other devices may be used for providing and/or receiving simulation data, such as a keypad or joystick, and that any of the above-described devices may be used from either inside or outside of driving station 2.

The preferred embodiments of the present invention preferably but not necessarily include a video means for displaying a sequence of visual images to a system user. As shown in FIG. 1, video means 6 preferably but not necessarily comprises three video projectors disposed forwardly of driving station 2. One video projector 60 is preferably positioned immediately forwardly of driving station 2 while video projectors 61 are preferably positioned to the right and left of video projector 60 so that the system user is provided with an approximately 180° forward field of view of a simulated environment. Video means 6 is preferably coupled to computing means 1 so that computing means 1 presents visual images on video means 6 which depict the simulated vehicle travelling in a simulated environment.

Figure 2:
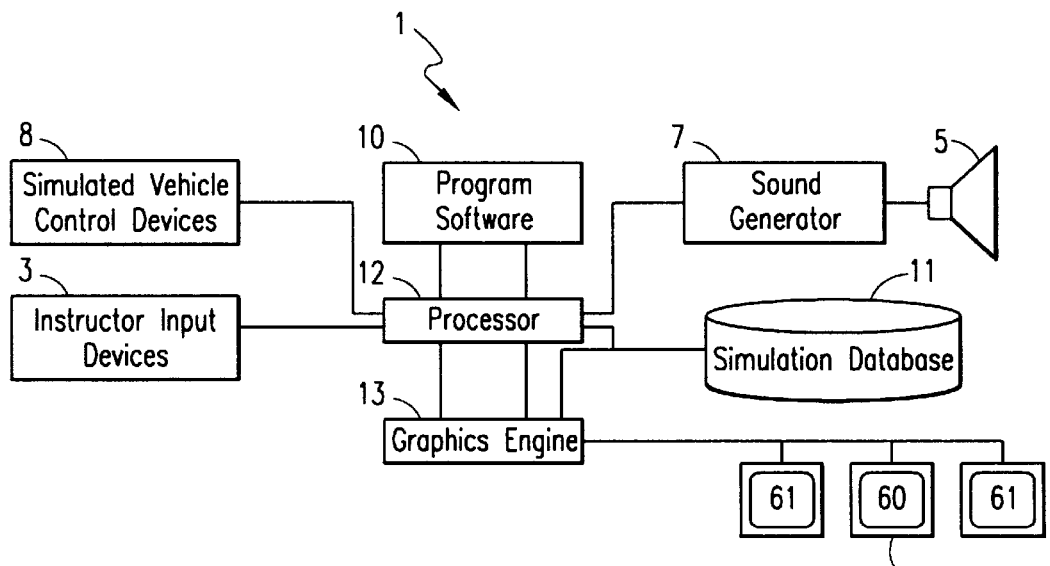
FIG. 2 is a block diagram of a preferred embodiment of the present invention.

Computing means 1 is preferably electrically connected to control devices 8 of the simulated vehicle and is operably associated with video means 6 so that computing means 1 presents a temporal sequence of visual images which depicts the operation of the simulated vehicle in a simulated environment. As shown in FIG. 2, computing means 1 preferably comprises processor 12 and program software 10 stored in memory so that processor 12 controls the simulation session in part by generating video signals and transmitting the video signals to video means 6. The video signals generated by computing means 1 are preferably in response to the activation of simulated vehicle control devices 8 by the system user so that a forward view of travel of the simulated vehicle in the simulated environment is presented thereto. In this way, the system user, such as a driving testee or video game participant, may experience a driving event by operating simulated vehicle control devices 8 and viewing the resulting presentation of images appearing on video means 6.

Accordingly, computing means 1 preferably includes a database 11 (FIG. 2) of a simulated environment stored in memory. The simulated environment preferably includes data representing a roadway network and terrain bordering the roadway network. Database 11 is preferably accessed by program software 10. The simulated roadway network in database 11 is preferably but not necessarily partitioned into highways, rural roads, and city streets, having features conventionally associated with each such roadway so the system accurately simulates travelling thereon by the simulated vehicle. It is understood that database 11 may be partitioned into a number of smaller databases.

Computing means 1 may further comprise a computer image generator 13 or other graphics engine.

Figure 14:
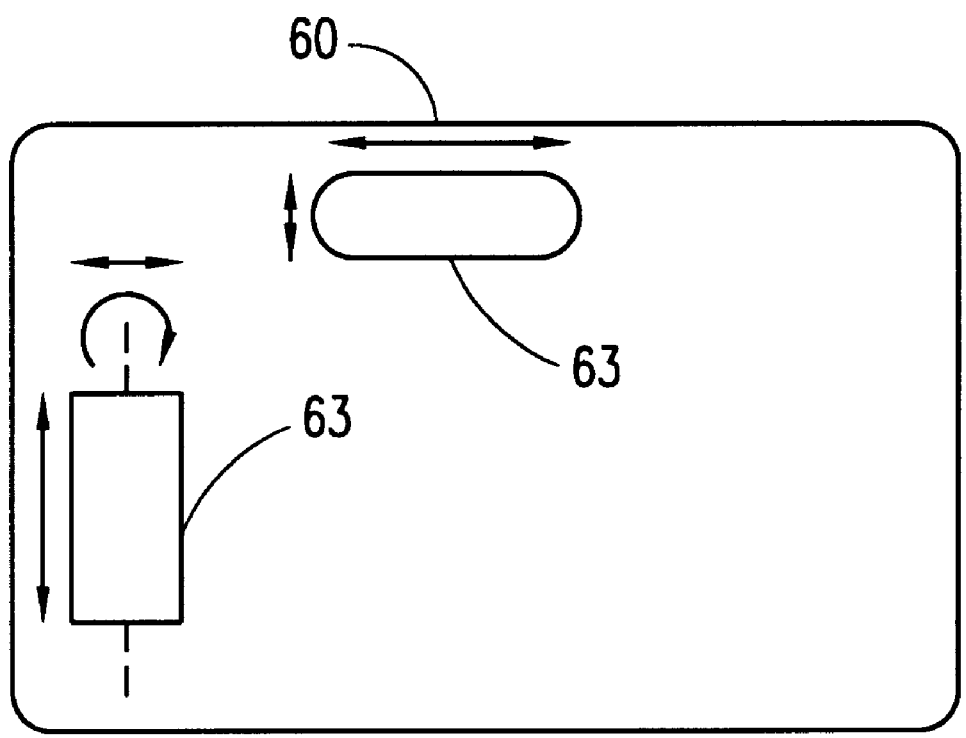
FIG. 14 is a user's view of a preferred embodiment of the present invention.

In addition to presenting a forward field of view of a simulated environment, computing means 1 preferably but not necessarily generates video signals so that a portion of the visual images projected on video means 6 includes a depiction of a rear view 63 of the simulated environment from the simulated vehicle, as shown in FIG. 14. In this way, the present invention simulates the operation of one or more rear view mirrors of a real vehicle.

Referring to FIG. 14, the present invention preferably but not necessarily includes a means for changing rear view image portion 63. The rear view changing means preferably includes software in program software 10 which allows a system user to change the size and shape of rear view image 63. Further, the rear view changing means preferably comprises a means for changing the location of rear view image 63 along video means 6, and a means for changing the orientation of rear view image 63. The changing means may preferably comprise a joystick 28 or other electromechanical device being on the dashboard of the simulated vehicle (FIG. 3). As a result, the view of the simulated environment may be tailored to accurately reflect the type of vehicle being simulated and to suit the operator of the simulated vehicle.

Moreover, computing means 1 preferably includes a means for simulating traffic in a simulation session. The traffic simulating means preferably but not necessarily presents objects in the simulated environment, such as pedestrians, traffic lights or other simulated vehicles, to which the first system user, in operating the simulated vehicle along the simulated roadway, must respond. Program software 10 preferably but not necessarily controls the general behavior of the simulated objects in the simulated environment so that each simulated object appears to the system user to be behaving substantially autonomously.

The traffic simulating means preferably but not necessarily includes a means for controlling the behavior of simulated objects in presenting simulated traffic to the system user operating the simulated vehicle. Program software 10 preferably but not necessarily allows a user to program the behavior of the simulated objects during the set up of a simulation session using keyboard 30, monitor 31 and mouse 32 (FIG. 1).

In this regard, program software 10 preferably but not necessarily provides one or more menus during the set up of the simulation session. Although the general behavior of the simulated objects is preferably controlled by program software 10 so the simulated objects substantially conform to the relevant traffic laws or rules of etiquette, the traffic behavior controlling means preferably allows the system user to specify the extent to which the simulated objects fail to conform thereto. The traffic behavior controlling means preferably controls the behavior of the simulated objects so that individual acts of malfeasance thereby appear substantially randomly to the system user operating the simulated vehicle.

For example, the traffic behavior controlling means preferably presents menus on monitor 31 at simulation setup to allow a system user to specify, using keyboard 30 or mouse 32, which simulated objects in the simulated environment are to act with malfeasance. During the corresponding simulation session, the selected simulated objects will thereupon exhibit a greater tendency to violate traffic laws or general rules of etiquette. Alternatively, the traffic behavior controlling means may allow the system user to specify which traffic laws one or more of the simulated objects will have a greater tendency to violate.

Further, in a preferred embodiment of the present invention, the traffic simulating means comprises a means for creating and dynamically controlling specific traffic events during the course of a simulation session to which the first system user operating the simulated vehicle must respond. The traffic event creating means preferably comprises code in program software 10 which allows a second system user, such as a driving instructor or video game participant, to both define a traffic event and present the traffic event during a simulation session to the first system user operating the simulated vehicle. The program software is preferably responsive to input from keyboard 30 and/or mouse 32 in defining and presenting the traffic event. Commencement of the presentation of the traffic event preferably occurs substantially immediately following the definition thereof by the second system user.

In a preferred embodiment of the present invention, the traffic event creating means includes a list of traffic events stored in memory in computing means 1 from which a second system user may select in defining a traffic event. The traffic event creating means preferably allows the second system user to select the desired traffic event from the list of stored traffic events by executing a command from keyboard 30 and/or mouse 32.

For example, the list of traffic events stored in memory may include an event in which a simulated vehicle travelling ahead of the system user's simulated vehicle along the simulated roadway stops suddenly (FIG. 4), thereby requiring immediate remedial action by the operator of the simulated vehicle.

Figure 7:
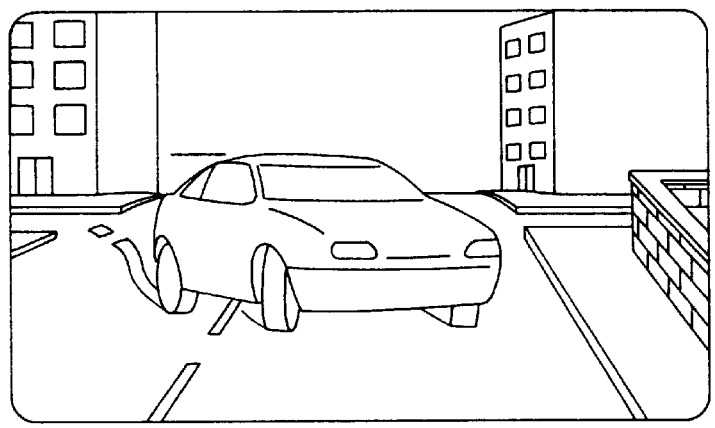
FIG. 7 is a user's view of a typical simulated environment provided by a preferred embodiment of the present invention.
Figure 5:
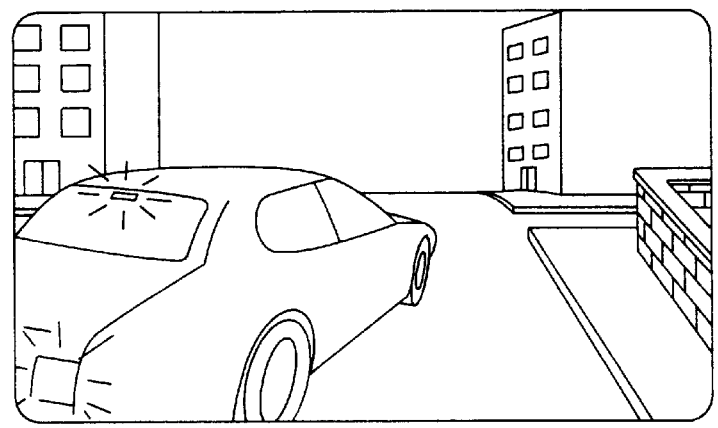
FIG. 5 is a user's view of a typical simulated environment provided by a preferred embodiment of the present invention.

Further, the stored list of traffic events may include an event in which a simulated vehicle travelling in the opposite direction from the system user's simulated vehicle along the simulated roadway veers into the system user's lane forwardly of the system user's vehicle, as shown in FIG. 7.

Still further, the stored list of traffic events may include an event in which a simulated vehicle merges into the lane in which the system user's simulated vehicle is travelling (FIG. 5), such as from an entrance ramp of a highway section of the simulated roadway network. This event may preferably include a second simulated vehicle which is positioned in an adjacent lane so that the first system user is prevented from merely changing lanes in response to the merging simulated vehicle.

Figure 6:
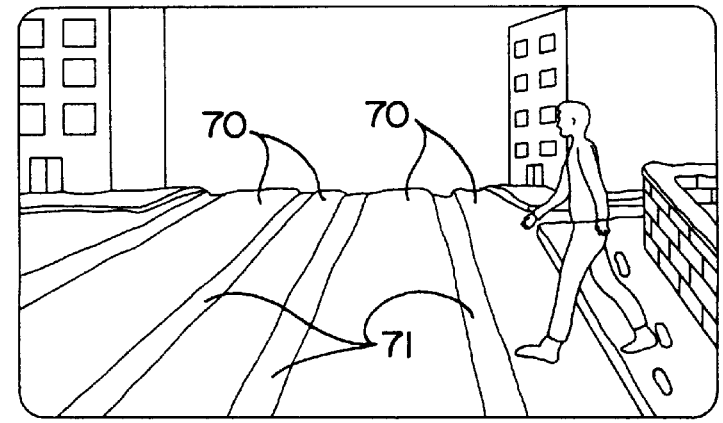
FIG. 6 is a user's view of a typical simulated environment provided by a preferred embodiment of the present invention.

The stored list of traffic events may further include an event in which a simulated object, such as a pedestrian, animal, bicyclist or simulated vehicle, darts across the simulated roadway forwardly of the simulated vehicle, as shown in FIG. 6.

The stored list of traffic events may also include a traffic light changing its present state to which the simulated vehicle operator must react.

In the event a police vehicle is being simulated by the present system, the stored list of traffic events may include a selected vehicle failing to respond to the siren and lights of the simulated police vehicle.

It is understood that the list of events stored in memory is not limited exclusively to storing traffic events, but is additionally capable of storing virtually any event which an operator of a vehicle may experience in the real world.

Following the definition of the desired traffic event, the traffic event creating means preferably presents the traffic event to the first system user in association with the display of the simulated environment being presented thereto. The presentation of the traffic event preferably but not necessarily commences substantially immediately after the traffic event is defined by the second system user. As a result, the second system user is capable of presenting on demand a desired traffic event to the first system user at substantially any time during a simulation session and at substantially any location along the simulated roadway network.

In a preferred embodiment of the present invention, the traffic event creating means presents the defined traffic event to the first system user by selecting a simulated object from the selected objects in the simulated environment and utilizing the selected simulated object in the traffic event. Specifically, the traffic event creating means includes code in program software 10 which first determines the type of simulated object which is necessary to carry out the defined traffic event. By way of one example, the type of simulated object required may be another simulated vehicle.

Figure 8:
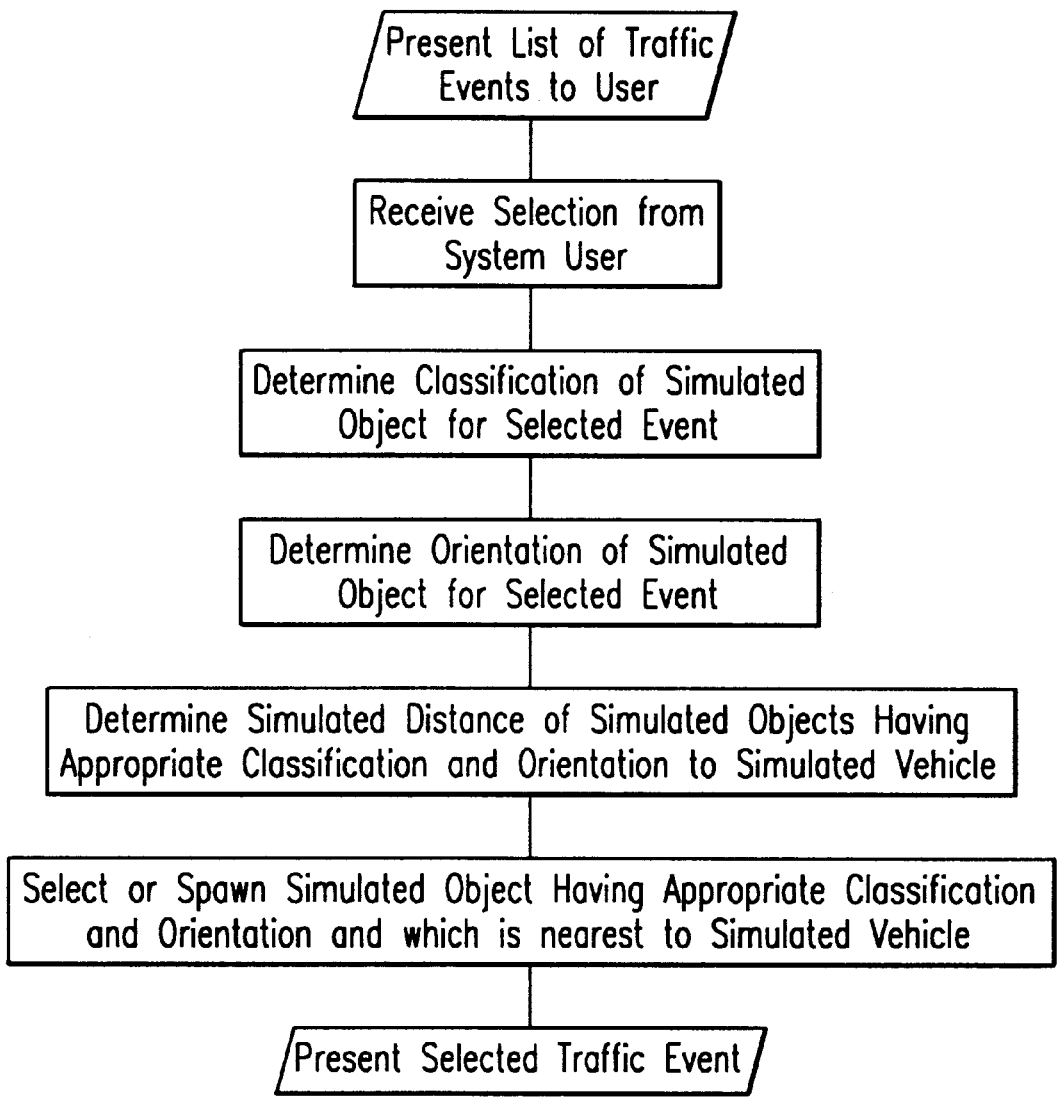
FIG. 8 is a flowchart depicting a portion of the execution of the traffic event creating means according to a preferred embodiment of the present invention.

Next, the traffic event creating means preferably selects the specific simulated object from those simulated objects in the simulated environment meeting the required classification. In a preferred embodiment of the present invention, program software 10 selects the simulated object based upon the location, speed and orientation of the simulated objects relative to the location and orientation of the simulated vehicle in the simulated environment. In this way, the traffic event creating means selects the simulated object which is most appropriately suited to substantially immediately participate in the desired traffic event. In the event no existing simulated objects are suitable to participate in presenting the desired traffic event, the traffic event creating means preferably spawns a simulated object and realistically incorporates the object into the simulated environment for participation in the traffic event. FIG. 8 shows a possible flowchart of the execution of the traffic event creating means according to one preferred embodiment of the present invention.

For example, in the event the second system user desires a simulated vehicle to stop suddenly in front of the first system user's simulated vehicle, the traffic event creating means determines that a simulated vehicle needs to be selected from the simulated objects in the simulated environment, and then, if there is a simulated vehicle within an appropriate range, selects the simulated vehicle which is driving in the same direction as the first system user's simulated vehicle, which is positioned forwardly of the simulated vehicle, and which is nearest thereto. Alternatively, in the event the second system user desires an oncoming simulated vehicle to veer into the lane in which the first system user is travelling, the traffic event creating means determines that an oncoming simulated vehicle must be selected, and then, if there is one or more oncoming simulated vehicles within an appropriate range, selects the simulated vehicle which is nearest the first system user's simulated vehicle.

After the traffic event is defined and the simulated object selected for participation therein, program software 10 preferably presents the traffic event to the system user operating the simulated vehicle, using video means 6.

In this preferred embodiment, the second system user is capable of choosing the precise time in which a desired traffic event is to occur by defining the desired traffic event based upon the location of simulated objects appearing in the simulated environment relative to the simulated vehicle, and based upon the location of the simulated vehicle in the simulated environment.

Further, the present invention includes a means for creating a plurality of traffic events on demand during a simulation session. In particular, the traffic event creating means includes code in program software 10 which allows the second system user to define and create any number of traffic events during the course of a simulation session. The traffic event creating means preferably allows the second system user to define and concurrently present a plurality of traffic events to the first system user at virtually any time in the simulation session. In this way, the operator of the simulated vehicle may be presented with a number of concurrent traffic events through which the operator must successfully navigate.

The preferred embodiments of the present invention further includes a means for audibly simulating the operation of the simulated vehicle. Referring to FIG. 2, the audio simulating means preferably includes sound generator 7 and speakers 5 which are connected to computing means 1. Speakers 5 are preferably situated within or around driving station 2. The audio simulating means preferably generates sounds in response to control of simulated vehicle control devices 8 by the system user so that speakers 5 emulate the simulated vehicle engine running, the simulated vehicle braking, the simulated vehicle tires skidding, the simulated vehicle shifting gears, etc. In addition, the audio simulating means preferably generates sounds of a simulated environment and the simulated vehicle's interaction therewith. For example, sound generator 7 and speakers 5 preferably but not necessarily generate sounds which simulate other vehicles in the simulated environment or the simulated vehicle hitting a curb, speed bump, pothole, or other simulated object appearing therein.

Computing means 1 preferably comprises interface software which allows a second system user to set parameters pertaining to a simulation session, such as environmental conditions for the session, simulation vehicle characteristics, and simulation vehicle failure parameters. The software preferably but not necessarily presents the simulation set up parameters to the second system user via a user friendly Graphical User Interface in which entries are made using mouse 32, keyboard 30 or other devices comprising input devices 3.

Further, computing means 1 means preferably allows the system user operating the simulated vehicle to view her performance during a simulation session. Program software 10 preferably includes software, controlled using keyboard 30 and mouse 32, which presents statistical information to the system user pertaining to a recently completed simulation session. The statistics are preferably but not necessarily presented to the user on monitor 31 in graphic form. The statistics preferably but not necessarily include statistics for elapsed time for the simulation session, speed limit conformance, following distance performance, lane position performance, fuel economy performance, gear shifting performance, driver reaction time to specific traffic events, and braking performance. The performance data may be printed or archived for future reference.

In addition, computing means 1 preferably but not necessarily provides the second system user, such as a driving instructor, with the ability to revisit portions of a simulation session either during the course of the simulation session or thereafter. Computing means 1 preferably includes code in program software 10 which is accessed by keyboard 30 and mouse 31 and which allows the second system user to selectively stop the simulation and freeze the image appearing on video means 6 so that the instructor may discuss a driving situation with the first system user; to selectively mark a location in the simulation session and return to it at any time thereafter; to replay a predetermined portion of the simulation session which has immediately completed; to designate and store a starting location for one or more simulation sessions, relative to the simulation roadway network; and to repeat a predetermined portion of the simulation session which has immediately completed so that the first system user may substantially immediately drive through the predetermined portion a number of times.

According to a preferred embodiment of the present invention, computing means 1 includes a means for simulating the operation of the simulated vehicle in various weather conditions. This weather simulating means preferably allows a user to specify any of a number of different weather conditions for use in a simulation session.

The weather simulating means preferably includes software in program software 10 which allows a user to select one or more weather related conditions during simulation setup for inclusion in a simulation session. For example, the weather simulating means may provide for the selection of snow, rain, fog, wind and/or temperature. Controls are preferably but not necessarily provided for each weather condition so that a user can specify the level or intensity of the selected weather condition.

Figure 9:
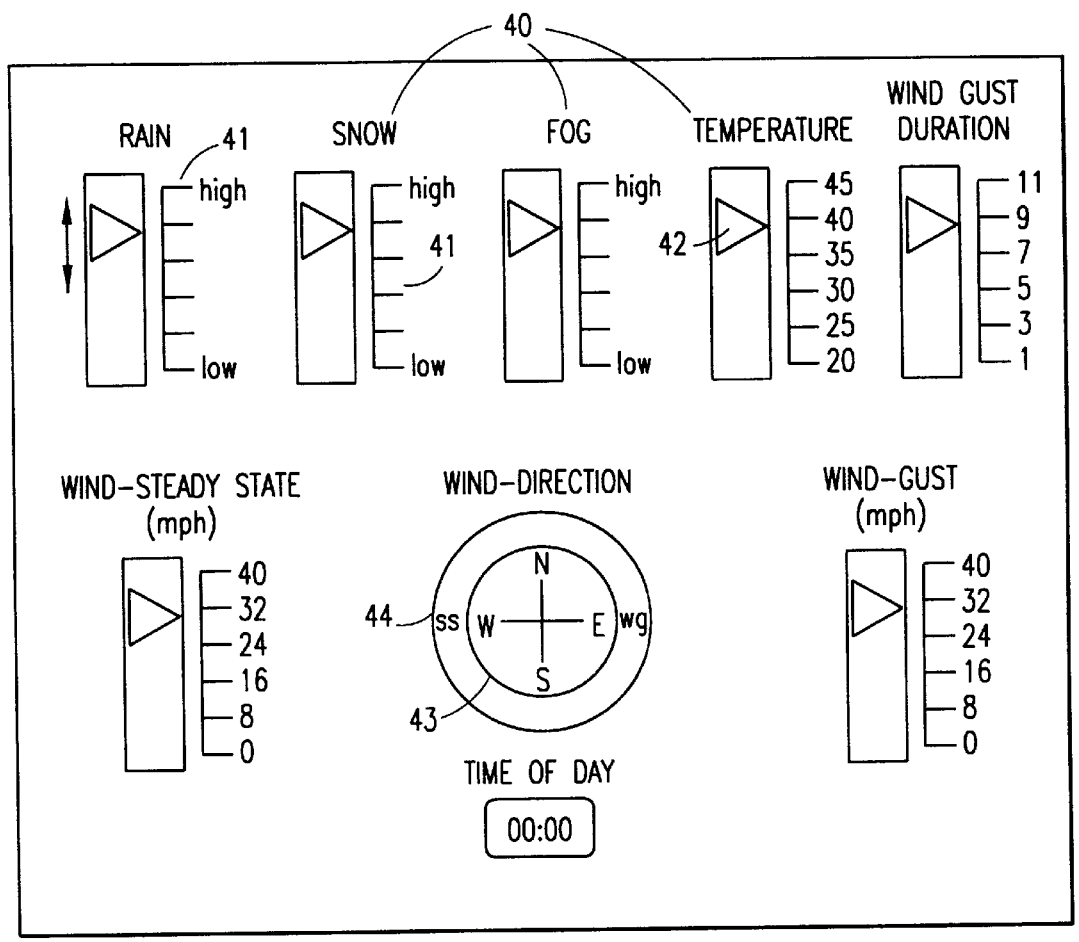
FIG. 9 is a diagram of a screen presented by the present system for specifying weather conditions for a simulation session.

Referring to FIG. 9, the weather simulating means preferably presents control members 40 on monitor 31 during simulation setup which are used to specify the desired weather conditions for a simulation session. Control member 40 preferably comprises a range of values 41 and a pointer member 42 which is selectively positioned to indicate a particular value from the range. A weather condition is preferably specified by sliding pointer member 42 to the desired value or level using keyboard 30 or mouse 32.

Figure 11:
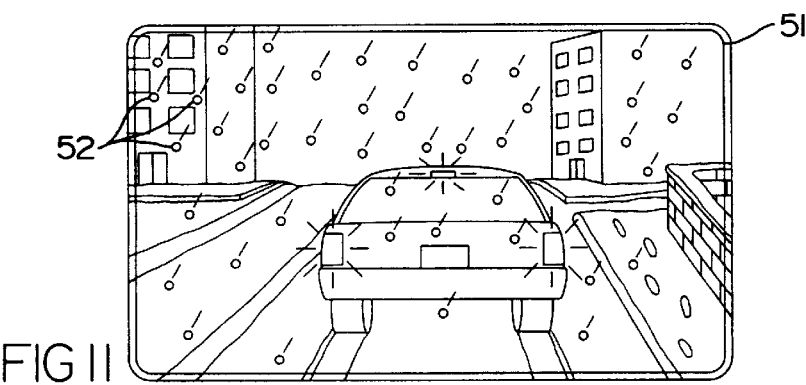
FIG. 11 is a user's view of a typical simulated environment provided by a preferred embodiment of the present invention.

In response to the selecting of the desired weather conditions using control members 40, the weather simulating means preferably but not necessarily includes a means for depicting falling precipitation, such as snow or rain, on video means 6. In one preferred embodiment of the present invention, the weather simulating means models falling snow or rain as an invisible, substantially three dimensional plane or curtain 51 on which rain drops or snow flakes substantially continuously fall. Curtain 51 is preferably situated forwardly of the simulated vehicle, as shown in FIG. 11. Falling rain drops or snow flakes 52 are preferably but not necessarily randomly presented on curtain 51. The density of falling snow flakes or rain drops is preferably in accordance with the intensity settings of control members 40 corresponding to snow and rain, respectively.

In addition, the weather simulating means preferably includes a means for depicting falling snow or rain hitting and accumulating on the simulated windshield of the simulated vehicle. In a preferred embodiment of the present invention, software code representing the weather simulating means preferably affects the view from the simulated vehicle by simulating rain drops hitting windshield 71 of the simulated vehicle and/or snow flakes hitting windshield 71 and melting thereon. As can be understood, the visual presentation of rain and/or snow hitting windshield 71 partially obscures the view of the simulated environment.

The weather simulating means preferably presents rain and/or snow hitting windshield 71 based upon the setting of weather condition control members 40 and upon the activation of windshield wiper control 27. In particular, the weather simulating means preferably adjusts the amount of snow/rain hitting windshield 71 to correspond to the level at which the rain/snow control member 40 is set.

Figure 12:
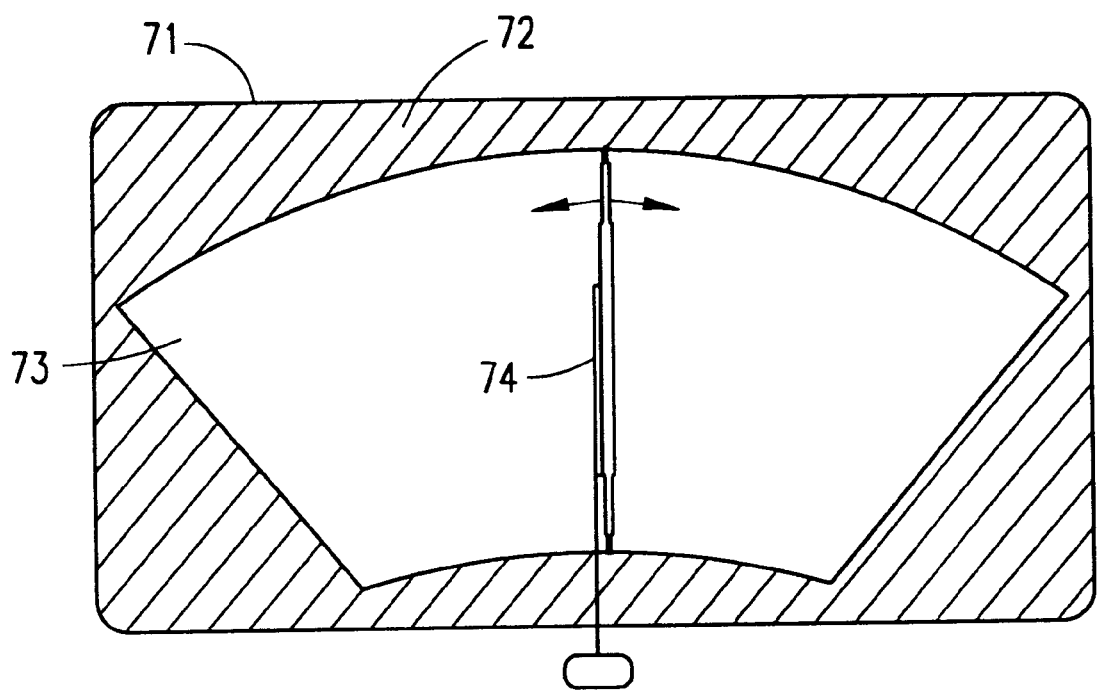
FIG. 12 is a front elevational view of a simulated windshield of a preferred embodiment of the present invention.

Moreover, if rain or snow is selected for a simulation session and windshield wiper control 27 is activated, the weather simulating means preferably models precipitation hitting windshield 71 by partitioning windshield 71 into sections having different levels of visibility. For example, the weather simulating means may preferably partition windshield 71 into a first section 72 which is outside the sweep of simulated windshield wiper 74 and a second section 73 which is within the sweep thereof, as shown in FIG. 12. The weather simulating means preferably then presents a static density of precipitation hitting first windshield section 72 and refreshes second windshield section 73 with a clearer view of the simulated environment following a passing of simulated windshield wiper 74. The visibility through second windshield section 73 preferably then progressively worsens between consecutive passes of windshield wiper 74 until it is refreshed with a substantially clear view of the simulated environment due to a subsequent sweep thereof.

The weather simulating means additionally preferably presents rain/snow hitting windshield 71 of the simulated vehicle as a function of other simulated vehicles appearing in the simulated environment. The weather simulating means preferably includes software which monitors the simulated distance between the simulated vehicle and vehicles appearing ahead thereof and, if a simulated vehicle is within a given range, varies the extent of rain/snow hitting windshield 71 so that the present system models rain/snow being kicked up by the forwardly disposed simulated vehicles. The amount of rain/snow hitting windshield 71 corresponding to snow kicked up by another simulated vehicle is preferably inversely proportional to the simulated distance to the simulated vehicle and directly proportional to the intensity setting of rain/snow control members 40.

Similarly, the weather simulating means preferably includes software which increases the snow/rain hitting windshield 71 as an oncoming simulated vehicle passes the simulated vehicle operated by the system user so that the present system simulates moisture being thrown upwardly by the oncoming simulated vehicle. The amount of moisture hitting windshield 71 corresponding to an oncoming simulated vehicle is preferably directly proportional to the simulated speed thereof and to the intensity setting of snow/rain control members 40.

Figure 10:
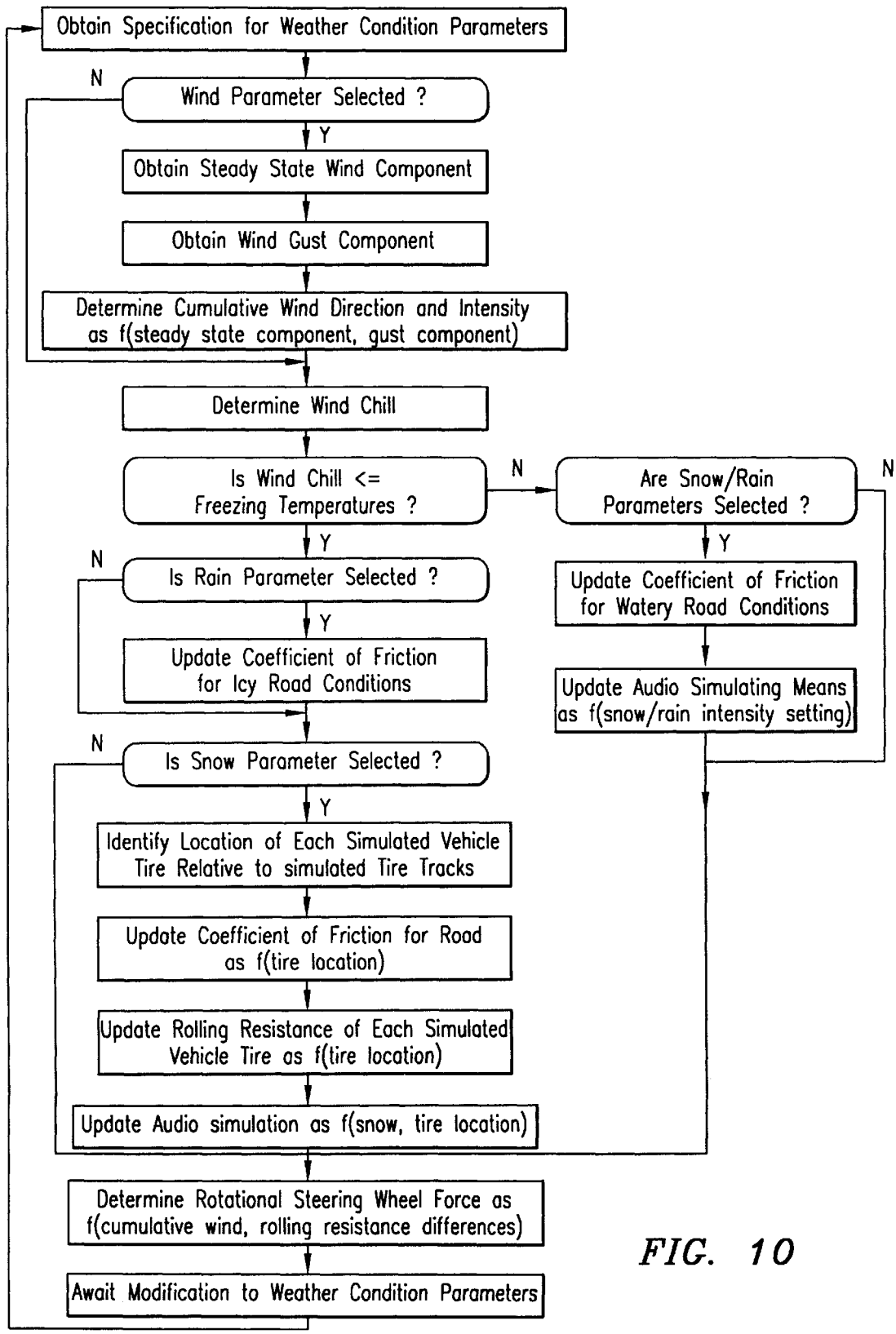
FIG. 10 is a diagram showing the execution of the weather simulating means of a preferred embodiment of the present invention.

In response to the settings of control members 40, the weather simulating means preferably further affects the visual presentation of the simulation environment by changing the visibility of objects appearing therein. Based upon the levels pointed to by control members 40 corresponding to rain, snow, fog and time-of-day settings, the present system adjusts the visibility of each simulated object shown in the simulated environment. For example, if a system user selects the simulated environment as having dense fog or being at night, the present invention diminishes the simulated objects appearing in the simulated environment into a muddled gray or black background, respectively. The execution of the weather simulating means according to a preferred embodiment of the present invention is shown in FIG. 10.

Upon the selection of the simulated environment having snow, the weather simulating means preferably simulates fallen snow therein. The weather simulating means preferably but not necessarily presents a view of travel by the simulated vehicle along a snow covered roadway. The snow covering the simulated roadway is preferably modelled in varying amounts in order to model a snow covered road having tire tracks defined therealong. Correspondingly, each lane of the snow covered, simulated roadway is preferably modelled as comprising first longitudinal roadway portions 70 having a first amount of snow accumulation thereon, and second longitudinal roadway portions 71 disposed between the first longitudinal roadway portions 70 and having a second amount of snow accumulation thereon (FIG. 6). The first amount of snow accumulation along roadway portion 70 is preferably but not necessarily greater than the second amount of snow accumulation along roadway portion 71.

In presenting a sequence of visual images which depicts a view of a simulated environment, computing means 1 preferably maps each visual image or "texture" onto the polygons which comprise the simulated roadway and associated terrain. To depict a snow covered roadway, the weather simulating means preferably utilizes an RGB modulated color texture. Specifically, the weather simulating means preferably modifies the surface texture of a simulated roadway so as to map successive, longitudinal segments of the roadway having substantially similar colors. As a result, the weather simulating means presents first longitudinal portions 70 having a substantially white or light gray color and second longitudinal portions 71 having a darkened gray color.

In addition, the weather simulating means preferably models the outlying terrain as white and off-white polygons on which is placed a texture comprising a substantially random combination of texels and/or sub-textures having different shades of gray. The resulting image is that of a mottled or blotched appearance.

According to a preferred embodiment of the present invention, the weather simulating means preferably but not necessarily provides control members 40 to the second system user on monitor 31 during the simulation session. As a result, the second system user is capable of dynamically controlling the nature and extent of the weather conditions for the simulated environment substantially throughout the entire simulation session.

In response to modifications to the simulation weather conditions during a simulation session, computing means 1 preferably changes the visual presentation of the simulation environment appearing on video means 6, the audio presentation of the simulation environment and the simulated vehicle, and the operation of the simulated vehicle.

The present invention preferably includes a means for modeling the dynamics of the simulated vehicle as the simulated vehicle travels along the simulated roadway. The dynamics modeling means preferably but not necessarily comprises code in program software 10 which utilizes a coefficient of friction of the simulated roadway and rolling resistance of the tires of the simulated vehicle in simulating the dynamic response of the simulated vehicle.

In a preferred embodiment of the present invention, the dynamics modeling means preferably but not necessarily calculates the coefficient of friction for the simulated roadway based upon the current state of the simulation environment as specified by weather control members 40. Specifically, the dynamics modeling means uses a lower coefficient of friction for the simulated roadway when rain, snow or ice is present thereon. As a result of using a reduced coefficient of friction, the operator of the simulated vehicle is more likely to experience different driving phenomena, including skidding, sliding, brake lockup, drive wheel tire spin, understeer, oversteer, and lateral drift.

Moreover, when snow is selected for inclusion in a simulation session, the dynamics modeling means preferably calculates the coefficient of friction for the portion of the simulated roadway on which the simulated vehicle is travelling, based upon the location of the simulated vehicle relative to second longitudinal roadway portions 71. For instance, when computing means 1 detects that the tires of the simulated vehicle are aligned with the first longitudinal roadway portions 70, the dynamics modeling means utilizes a coefficient of friction corresponding to a roadway having the first amount of snow accumulation thereon. Conversely, when program software 10 detects that the tires of the simulated vehicle are substantially aligned with second longitudinal roadway portions 71, the dynamics modeling means utilizes a coefficient of friction corresponding to a roadway having the second amount of snow accumulation thereon. In this way, the simulated vehicle substantially closely follows the handling of a real vehicle on a snow covered roadway.

Similarly, the dynamics modeling means preferably but not necessarily calculates the rolling resistance of the simulated vehicle tires based upon whether snow is selected for a simulation session. When snow is selected, the dynamics modeling means preferably calculates the rolling resistance of the simulated vehicle tires based upon the location of the tires relative to second longitudinal roadway portions 71.

Figure 13:
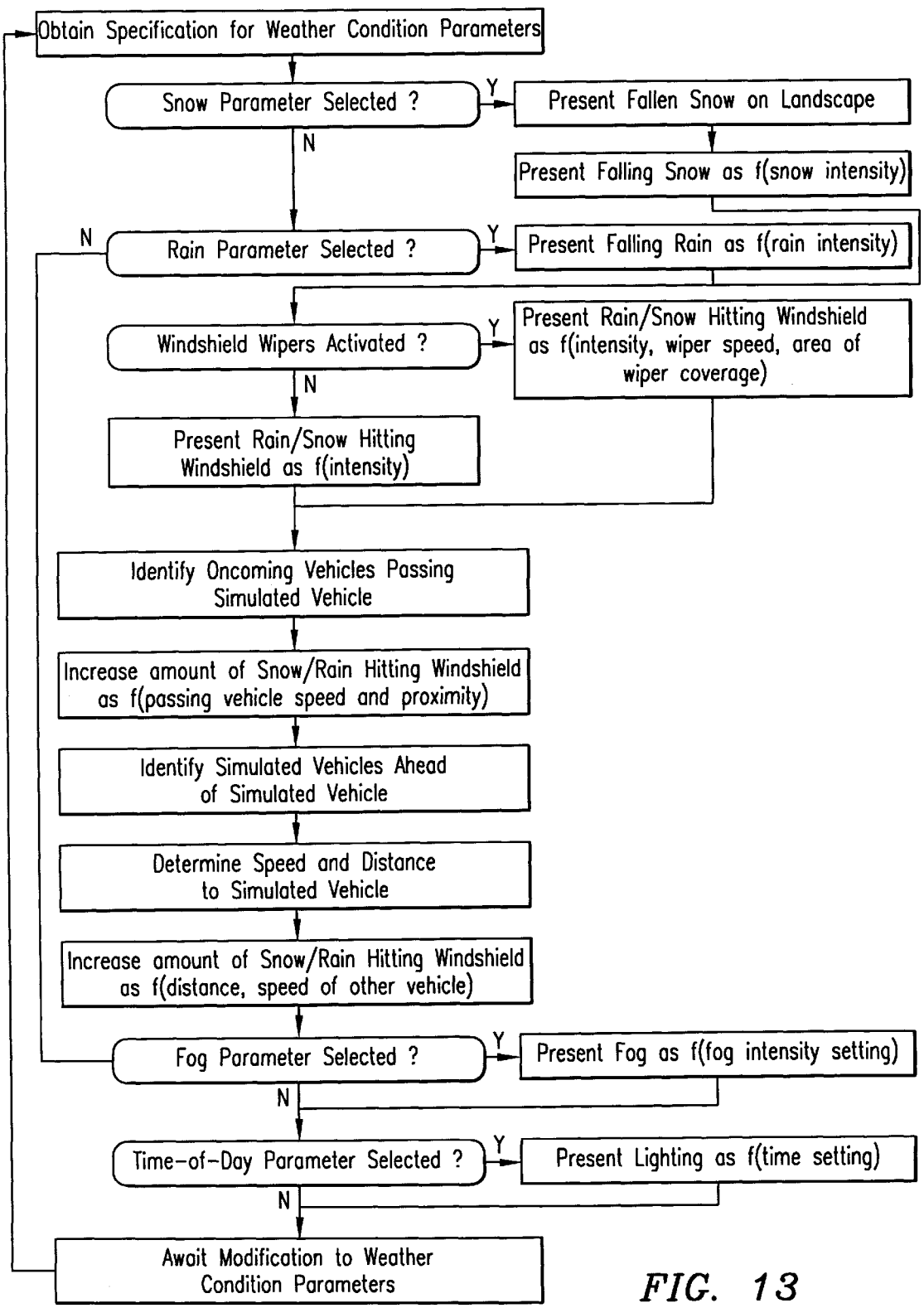
FIG. 13 is a diagram showing the execution of the dynamics modeling means according to a preferred embodiment of the present invention.

For instance, when program software 10 corresponding to the dynamics modeling means detects that the tires of the simulated vehicle are substantially aligned with first longitudinal roadway portions 70, the dynamics modeling means utilizes the rolling resistance corresponding to travelling over the first amount of snow accumulation. Conversely, when program software 10 detects that the tires are aligned with second longitudinal roadway portions 71, the dynamics modeling means utilizes the rolling resistance corresponding to travel over the second amount of snow accumulation. FIG. 13 shows a typical execution sequence for the dynamics modeling means for a preferred embodiment of the present invention.

According to a preferred embodiment of the present invention, the weather simulating means preferably but not necessarily cooperates with the audio simulating means to audibly simulate the operation of the simulated vehicle in snow or rain. A portion of program software 10 representing the weather simulating means and the audible simulating means preferably transmits signals to sound generator 7 which emulate the sound of a vehicle driving over snow or rain, snow or rain hitting the undercarriage, windshield and/or body of a moving vehicle, etc.

Further, the volume level of the sound generated by speakers 5 is preferably dependent upon the location of the simulated vehicle tires relative to second longitudinal roadway portions 71. When the simulated vehicle tires are substantially aligned with first longitudinal roadway portions 70, program software 10 causes speakers 5 to generate the snow sounds at a first volume level. When the simulated vehicle tires are substantially aligned with second longitudinal roadway portions 71, program software 10 preferably causes speakers 5 to generate the snow sounds at a second volume level which is less than the first volume level.

The weather simulating means preferably simulates the effect of temperature on the simulation environment during a simulation session. As shown in FIG. 9, the weather simulating means preferably provides at least one sliding control member 40 on monitor 31 during simulation setup and during the simulation session so that a system user may dynamically specify the temperature of the simulation environment during the simulation session. Upon completion of the temperature specification, the present system preferably substantially commences modelling the effect of temperature on the simulated environment using the dynamic modelling means.

The weather simulating means and the dynamic modelling means preferably simulate the effect of wind in a simulation session. As shown in FIG. 9, the weather simulating means preferably provides one or more control members 40 on monitor 31 during simulation setup and during the simulation session so that a system user may have dynamic control over the selection and specification of a steady state wind during the simulation session. In a preferred embodiment of the present invention, software code pertaining to the weather simulating means allows a system user to specify the intensity of the steady state wind, in miles per hour, and the direction thereof. Control member 40 corresponding to wind direction preferably comprises a compass 43 around which an icon 44 representing steady state wind may be selectively positioned.

In addition, the weather simulating means preferably allows a system user to select and specify, during the simulation setup and the simulation session, the presence of wind gusts. As shown in FIG. 9, the weather simulating means preferably presents control members 40 on monitor 31 which allow a user to specify the intensity of a wind gust, the duration of the wind gust and the direction thereof. As a result, the present invention provides dynamic control of wind in a simulation session.

Upon adjustment of the temperature control member 40 and wind control members 40 (FIG. 9) during a simulation session, the present invention preferably updates the driving conditions in the simulation environment. In one embodiment of the present invention, the weather simulating means preferably calculates a wind chill temperature based upon the temperature and wind settings of control members 40. If the simulated roadway is wet, such as from having selected rain to occur in the simulation session, and the calculated wind chill temperature was adjusted from a temperature above freezing temperatures to a temperature at or below freezing temperatures, then the dynamic modelling means preferably changes the coefficient of friction for the roadway surface to simulate black ice appearing thereon without substantially changing the appearance of the simulated roadway. Conversely, adjusting the temperature control setting and/or the wind control settings from a wind chill temperature below freezing to a wind chill temperature above freezing causes the dynamic modelling means to change the coefficient of friction of the roadway from a value corresponding to icy conditions to a value corresponding to a wet surface. FIG. 13 shows a typical execution sequence of the dynamic modelling means.

Further, the wind settings will preferably affect the dynamic state of the simulated vehicle. For instance, a wind of sufficient magnitude may change the speed and orientation of the simulated vehicle. A cross wind, relative to the simulated vehicle, may push the vehicle in the direction thereof.

The dynamics modeling means of the present invention preferably but not necessarily includes a means for applying a pulling force on steering wheel 21 which simulates the effects due to a number of different driving phenomena. The force applying means preferably but not necessarily comprises torque generator 7 which is operably connected to steering wheel 21 and to computing means 1 so that code in program software 10 corresponding to the force applying means may rotate or resist rotation of steering wheel 21 based upon current driving conditions.

For instance, the force applying means preferably but not necessarily simulates a difference in the rolling resistances of the tires of the simulated vehicle by applying a rotational force on steering wheel 21. The force applying means preferably includes program software in program software 10 which detects a difference in the rolling resistance of the simulated vehicle tires and generates a substantially steady-state rotational force on steering wheel 21 accordingly. During a simulation session in which snow is selected, the substantially steady-state force preferably reaches a maximum amount of force when the simulated vehicle tires transition between first longitudinal roadway portions 70 and second longitudinal roadway portions 71.

In addition, the force applying means preferably but not necessarily simulates the effect of cross winds acting on the simulated vehicle. Computing means 1 preferably computes simulated cross winds acting on the simulated vehicle based upon the steady state wind and wind gust components which are specified by the system user, and applies a rotational force on steering wheel 21 accordingly.

In use, a system user preferably specifies the characteristics of the simulation session during setup. Using keyboard 30, monitor 31 and mouse 32, the system user configures the simulation session by entering parameters pertaining to the characteristics of the simulated vehicle, to vehicle failure, and to weather conditions. The system user may further specify the general behavior of traffic in the simulated environment.

During the simulation session, processor 12 cooperates with program software 10 and simulation database 11 to present a temporal sequence of visual images on video means 6 which depicts a view of the simulated vehicle in the simulated environment. The visual images presented on video means 6 is in accordance with the operation of control devices 8 of the simulated vehicle by the first system user. Computing means 1 presents a simulated roadway network on which the first system user travels in operating control devices 8.

During the simulation session, the second system user selectively defines one or more traffic events by selecting an event from a list of traffic events stored in memory. Substantially immediately after the desired traffic event is selected, the traffic event creating means presents the traffic event to the first system user by selecting or spawning a simulated object in the simulated environment having the necessary characteristics, being an appropriate distance from the simulated vehicle, and having the necessary spatial orientation relative to the simulated vehicle. Upon selecting or spawning the simulated object for participation in the traffic event, the traffic creating means presents the traffic event to the first system user as part of the visual images depicting an outward view of the simulated environment.

If a system user selects and defines the simulated weather conditions as including precipitation, the present invention presents falling precipitation, falling precipitation hitting simulated windshield 71 of the simulated vehicle, and precipitation hitting windshield 71 due to simulated objects appearing in the simulation.

If snow was selected during setup of the simulation session, computing means 1 generates video signals which depict a snow covered environment, including a snow covered roadway having tire tracks defined therealong. The present invention generates sounds typically associated with travelling on snow, with the sound generation being a function of the position of the tires of the simulated vehicle relative to the simulated tire tracks.

Computing means 1 alters the dynamics of the simulated vehicle in part by calculating both the coefficient of friction of the simulated roadway and the rolling resistance of the simulated vehicle tires based upon the position of the simulated vehicle tires relative to the tire tracks appearing on the simulated roadway. As a result of the coefficient of friction being a function of a snow covered roadway, the simulated vehicle exhibits a greater tendency to slide, skid or experience other phenomena typically associated with driving on snow. Computing means 1 utilizes the calculation of the rolling resistance of each tire of the simulated vehicle to detect a difference therebetween and to apply a rotational force on steering wheel 21 accordingly.

Throughout the simulation session, the second system user may modify the weather conditions of the simulated environment by adjusting control members 40 to specify new weather conditions. Upon a change in the desired weather conditions, the present invention substantially immediately alters the visual presentation of the simulated environment, the audio presentation of the simulated environment and of the simulated vehicle, and the operation of the simulated vehicle accordingly.

Although there have been described what are at present considered to be the preferred embodiments of the present invention, it will be understood that the invention can be embodied in other specific forms without departing from the spirit or essential characteristics thereof.

The described embodiments are, therefore, to be considered in all aspects as illustrative, and not restrictive. The scope of the invention is indicated by the appended claims rather than the foregoing description.

We claim:

1. A system for simulating the operation of a simulated vehicle, comprising:
   a display device for displaying a sequence of visual images;
   a plurality of control devices for said simulated vehicle for manipulation by a first user; and
   processing means, responsive to manipulation of said control devices, for presenting a sequence of visual images on said display device which depicts said simulated vehicle traveling in a simulated environment;
   said processing means allows a second user to select said simulated environment to include precipitation, and presents said sequence of visual images so as to depict said simulated environment having precipitation following said selecting thereof by said second user;
   said processing means calculates a rolling resistance of at least one tire of said simulated vehicle based upon said precipitation and incorporates said rolling resistance of said at least one tire into said simulated operation of said simulated vehicle.

2. A system as recited in claim 1, wherein:
   said precipitation comprises individual falling particles of precipitation in simulated environment.

3. A system as recited in claim 1, wherein:
   said processing means selectively allows said second user to select an amount of wind in said simulated environment;
   said simulated vehicle control devices include a steering wheel; and
   said system includes a device for applying a rotational force to said steering wheel based upon said amount of wind selected.

4. A system as recited in claim 1, further including:
   a device, in communication with said computing means, for audibly simulating said simulated vehicle in said simulated environment, said audible simulation being based upon said precipitation being selected.

5. The system of claim 1, wherein:
   said processing means allows said second user to select said simulated environment to include precipitation during said presenting of said sequence of visual images.

6. The system of claim 1, wherein:
   said processing means allows said second user to select said simulated environment to include precipitation during said presenting of said sequence of visual images.

7. A system for simulating the operation of a simulated vehicle, comprising:
   a display device for displaying a sequence of visual images;
   a plurality of control devices for said simulated vehicle for manipulation by a first user; and
   processing means, responsive to manipulation of said control devices, for presenting a sequence of visual images on said display device which depicts said simulated vehicle traveling in a simulated environment;
   said processing means allows a second user to select said simulated environment to include precipitation, and presents said sequence of visual images so as to depict said simulated environment having precipitation following said selecting thereof by said second user;
   said simulated vehicle includes a simulated windshield in said sequence of visual images; and
   said processing means allows said second user to select falling precipitation, and presents falling precipitation hitting said simulated windshield of said simulated vehicle.

8. A system as recited in claim 7, wherein:
   said simulated environment includes a plurality of simulated objects moving in said environment; and said precipitation hitting said simulated windshield is based upon a location of said simulated objects in said simulated environment, relative to said simulated vehicle.

9. The system of claim 7, wherein:
   said processing means allows said second user to select an amount of wind in said simulated environment;
   said simulated vehicle control devices include a steering wheel; and
   said system includes a device for applying a rotational force to said steering wheel based upon said amount of wind selected.

10. A system as recited in claim 7, further including:
    a device, in communication with said computing means, for audibly simulating said simulated vehicle in said simulated environment, said audible simulation being based upon said precipitation being selected.

11. The system of claim 7, wherein:
    said processing means allows said second user to select said simulated environment to include precipitation during said presenting of said sequence of visual images.

12. A system for simulating the operation of a simulated vehicle, comprising:
    a display device for displaying a sequence of visual images;
    a plurality of control devices for said simulated vehicle for manipulation by a first user; and
    processing means, responsive to manipulation of said control devices, for presenting a sequence of visual images on said display device which depicts said simulated vehicle traveling in a simulated environment;
    said processing means allows a second user to select said simulated environment to include precipitation, and presents said sequence of visual images so as to depict said simulated environment having precipitation following said selecting thereof by said second user;
    said simulated environment includes a roadway on which said simulated vehicle travels based upon manipulation of said simulated vehicle control devices; and
    said processing means presents fallen snow on said roadway, said roadway comprising first longitudinal roadway portions having a first amount of fallen snow accumulated thereon, and second longitudinal roadway portions disposed between said first longitudinal roadway portions.

13. The system of claim 12, wherein said precipitation comprises individual falling particles of precipitation in said simulated environment.

14. The system of claim 12, wherein:
    said processing means selectively allows said second user to select an amount of wind in said simulated environment;

said simulated vehicle control devices include a steering wheel; and said system includes a device for applying a rotational force to said steering wheel based upon said amount of wind selected.

15. The system of claim 12, wherein:

said processing means allows said second user to select said simulated environment to include precipitation during said presenting of said sequence of visual images.

16. A system for simulating the operation of a simulated vehicle, comprising:

a display device for displaying a sequence of visual images;

a plurality of control devices for said simulated vehicle for manipulation by a first user; and processing means, responsive to manipulation of said control devices, for presenting a sequence of visual images on said display device which depicts said simulated vehicle traveling in a simulated environment;

said processing means allows a second user to select said simulated environment to include precipitation, and presents said sequence of visual images so as to depict said simulated environment having precipitation following said selecting thereof by said second user;

said simulated vehicle includes simulated tires in said simulated environment;

said simulated environment includes a roadway on which said simulated vehicle travels based upon manipulation of said simulated vehicle control devices;

said processing means presents fallen snow on said roadway, said roadway comprising first longitudinal roadway portions having a first amount of said fallen snow accumulated thereon, and second longitudinal roadway portions disposed between said first longitudinal roadway portions; and said processing means calculates a rolling resistance of each of said simulated tires based on a position of said simulated tires relative to said first and said second longitudinal roadway portions.

17. A system as recited in claim 16, wherein:

said simulated vehicle control devices include a steering wheel; and said system includes a device, in communication with said processing means, for applying a rotational force to said steering wheel based upon said rolling resistances of said simulated tires.

18. The system of claim 16, wherein said precipitation comprises individual falling particles of precipitation in said simulated environment.

19. A system as recited in claim 16, further including:

a device, in communication with said computing means, for audibly simulating said simulated vehicle in said simulated environment, said audible simulation being based upon said precipitation being selected.

20. The system of claim 16, wherein:

said processing means allows said second user to select said simulated environment to include precipitation during said presenting of said sequence of visual images.

21. A system for simulating the operation of a simulated vehicle, comprising:

a display device for displaying a sequence of visual images;

a plurality of control devices for said simulated vehicle for manipulation by a first user; and processing means, responsive to manipulation of said control devices, for presenting a sequence of visual images on said display device which depicts said simulated vehicle traveling in a simulated environment;

said processing means allows a second user to select said simulated environment to include precipitation, and presents said sequence of visual images so as to depict said simulated environment having precipitation following said selecting thereof by said second user;

said simulated environment includes a roadway on which said simulated vehicle travels based upon manipulation of said simulated vehicle control devices;

said processing means computes a coefficient of friction for said roadway and incorporates said coefficient of friction computation into said simulated operation; and said coefficient of friction computation is based upon said precipitation being selected by the second user.

22. A system as recited in claim 21, wherein:

said processing means presents fallen snow on said roadway, said roadway comprising first longitudinal roadway portions having a first amount of said fallen snow accumulated thereon, and second longitudinal roadway portions disposed between said first longitudinal roadway portions; and said processing means calculates said coefficient of friction for said simulated roadway based upon a position of tires of said simulated vehicle relative to said first and second longitudinal roadway portions.

23. A system as recited in claim 21, wherein:

said processing means allows said second user to specify a temperature for said simulated environment; and said processing means computes a coefficient of friction based upon a temperature specified by said second user.

24. The system of claim 21, wherein said precipitation comprises individual falling particles of precipitation in said simulated environment.

25. A system as recited in claim 21, further including:

a device, in communication with said computing means, for audibly simulating said simulated vehicle in said simulated environment, said audible simulation being based upon said precipitation being selected.

26. The system of claim 21, wherein:

said processing means allows said second user to select said simulated environment to include precipitation during said presenting of said sequence of visual images.

27. A method of simulating the operation of a vehicle, comprising the steps of:

receiving operator data corresponding to manipulation of control devices of said vehicle;

presenting a temporal sequence of visual images depicting the vehicle traveling in a simulated environment based in part upon said operator data; and receiving a request for said simulated environment to include precipitation, so that said step of presenting depicts said simulated environment including precipitation following said selection thereof;

said step of presenting depicts said simulated environment having at least one roadway on which said vehicle travels based upon said received operator data, and fallen snow appearing on said roadway such that said roadway includes first roadway portions having a first amount of snow accumulation thereon and second roadway portions forming tire tracks on said roadway, in response to receiving said request.

28. The method of claim 27, wherein:

said request comprises a request for said simulated environment to include falling snow.

29. The method of claim 27, wherein:

said request comprises a request for said simulated environment to include falling rain.

30. The method of claim 27, wherein:

said vehicle includes simulated tires in said simulated environment; and said method comprises the steps of computing at least one rolling resistance of said simulated tires based upon a position of said simulated tires on said roadway relative to said first and said second roadway portions, and including said rolling resistance into said operation of said vehicle.

31. The method of claim 30, wherein:

said step of computing a roadway resistance computes a first rolling resistance value for at least one simulated tire when said simulated tire is on said first roadway portion, and computes a second rolling resistance value for said at least one simulated tire when said simulated tire is on said second roadway portion, said first rolling resistance value being different from said second rolling resistance value.

32. The method of claim 27, wherein:

said control devices include a steering wheel and said vehicle includes simulated tires in said simulated environment; and said method comprises the steps of:

computing a rolling resistance for each of said simulated tires based upon a position of said simulated tire on said roadway relative to said first and said second roadway portions; and applying a rotational force to said steering wheel based upon said rolling resistances computed during said step of computing.

33. The method of claim 27, wherein:

said vehicle includes simulated tires in said simulated environment; and said method further comprises the steps of:

computing a first coefficient of friction for said first portions of said roadway and a second coefficient of friction for said second portions of said roadway; and incorporating one of said first coefficient of friction and said second coefficient of friction into said simulated operation of said vehicle based upon a position of said simulated tires relative to said first and said second roadway portions.

34. The method of claim 27, wherein:

said vehicle includes simulated tires in said simulated environment; and said method further comprises the steps of:

audibly simulating said simulated operation of said vehicle based upon a position of said tires relative to said first and said second roadway portions.

35. The method of claim 27, wherein:

said control devices include a steering wheel and said vehicle includes simulated tires in said simulated environment; and said method further comprises the steps of:

selecting, during said step of presenting, said simulated environment to include an amount of wind so that said step of presenting depicts said simulated environment including wind following said selecting thereof; and applying a rotational force to said steering wheel based upon said wind amount selected.

36. The method of claim 27, wherein:

said step of presenting depicts said simulated environment having a roadway on which said vehicle travels based upon said operator data; and said method further comprises the steps of:

calculating a coefficient of friction for said roadway based upon said simulated environment including precipitation; and incorporating said coefficient of friction into said simulated operation of said vehicle.

37. The method of claim 27, wherein:

said step of receiving occurs during said step of presenting.

38. A method of simulating the operation of a vehicle, comprising the steps of:

receiving operator data corresponding to manipulation of control devices of said vehicle;

presenting a temporal sequence of visual images depicting the vehicle traveling in a simulated environment based in part upon said operator data; and receiving a request for said simulated environment to include precipitation, so that said step of presenting depicts said simulated environment including precipitation following said selection thereof;

said step of presenting presents said visual images depicting a simulated windshield of said vehicle and said precipitation hitting said windshield in response to receiving said request.

39. The method of claim 38, wherein:

said step of presenting presents said visual images depicting a simulated windshield wiper of sa id vehicle and removes at least some of said precipitation hitting said windshield in conjunction with movement of said simulated windshield wiper.

40. The method of claim 38, wherein:

said control devices include a steering wheel and said vehicle includes simulated tires in said simulated environment; and said method further comprises the steps of:

receiving a request for said simulated environment to include an amount of wind so that said step of presenting depicts said simulated environment including wind following said selecting thereof; and applying a rotational force to said steering wheel based upon said wind amount requested.

41. The method of claim 38, wherein:

said step of presenting depicts said simulated environment having a roadway on which said vehicle travels based upon said operator data; and said method further comprises the steps of:

calculating a coefficient of friction for said roadway based upon said simulated environment including precipitation; and incorporating said coefficient of friction into said simulated operation of said vehicle.

42. The method of claim 38, wherein:

said step of receiving occurs during said step of presenting.

* * * * *